US010445874B2

(12) United States Patent
Prabhu et al.

(10) Patent No.: US 10,445,874 B2
(45) Date of Patent: Oct. 15, 2019

(54) SYSTEM AND METHOD FOR DETECTING A DISSIMILAR OBJECT IN UNDERCARRIAGE OF A VEHICLE

(71) Applicant: VEHANT TECHNOLOGIES PRIVATE LIMITED, Noida (IN)

(72) Inventors: Anoop G Prabhu, Noida (IN); Kapil Bardeja, Noida (IN)

( * ) Notice: Subject to any disclaimer, the term of this patent is extended or adjusted under 35 U.S.C. 154(b) by 0 days.

(21) Appl. No.: 15/822,721

(22) PCT Filed: Jun. 9, 2016

(86) PCT No.: PCT/IN2016/050178
§ 371 (c)(1),
(2) Date: Nov. 27, 2017

(87) PCT Pub. No.: WO2016/199171
PCT Pub. Date: Dec. 15, 2016

(65) Prior Publication Data
US 2018/0137614 A1 May 17, 2018

(30) Foreign Application Priority Data

Jun. 9, 2015 (IN) ............................ 1719/DEL/2015

(51) Int. Cl.
*G06T 7/00* (2017.01)
*G06T 7/11* (2017.01)
(Continued)

(52) U.S. Cl.
CPC ............ *G06T 7/001* (2013.01); *G06T 7/0002* (2013.01); *G06T 7/11* (2017.01); *G06T 7/70* (2017.01);
(Continued)

(58) Field of Classification Search
CPC ... G06T 7/001; G06T 7/11; G06T 7/70; G06T 7/0002; G06T 2207/10012;
(Continued)

(56) References Cited

U.S. PATENT DOCUMENTS

| 7,555,148 B1* | 6/2009 | Steinberg | G06F 16/583 |
| | | | 382/118 |
| 2008/0211914 A1* | 9/2008 | Herrera | H04N 7/18 |
| | | | 348/148 |

(Continued)

*Primary Examiner* — Jianxun Yang (57) ABSTRACT

An under vehicle scanning system that detects a dissimilar object in a vehicle is provided. The under vehicle scanning system includes a scanner and acquisition module that captures 3D images of an undercarriage of the vehicle at multiple instants, an analysis and processing module that processes the 3D images to obtain 3D profiles of the vehicle, and a display module that highlights the dissimilar object. The analysis and processing module is configured to: (a) normalize variations in orientation of the 3D profiles of the vehicle's undercarriage, (b) generate a 3D signature of the vehicle based on the normalized 3D profiles of the vehicle's undercarriage, (c) identify a model of the vehicle based on the 3D signature of the vehicle, and (d) compare the 3D profiles of the vehicle with a standard profile of the undercarriage of a same model vehicle using the 3D signature to detect the dissimilar object.

9 Claims, 8 Drawing Sheets

(51) Int. Cl.
*G06T 7/70* (2017.01)
*H04N 5/232* (2006.01)

(52) U.S. Cl.
CPC ............... *H04N 5/23293* (2013.01); *G06T 2207/10012* (2013.01); *G06T 2207/10028* (2013.01); *G06T 2207/20076* (2013.01); *G06T 2207/30232* (2013.01); *G06T 2207/30252* (2013.01)

(58) Field of Classification Search
CPC . G06T 2207/10028; G06T 2207/20076; G06T 2207/30232; G06T 2207/30252; H04N 5/23293; H04N 7/18; H04N 5/23222; G07C 5/0808; G06F 16/583
See application file for complete search history.

(56) References Cited

U.S. PATENT DOCUMENTS

| | | | |
|---|---|---|---|
| 2015/0116529 A1* | 4/2015 | Wu .................. | H04N 5/23222 348/222.1 |
| 2015/0269792 A1* | 9/2015 | Wood ................ | G07C 5/0808 701/31.5 |

* cited by examiner

SYSTEM AND METHOD FOR DETECTING A DISSIMILAR OBJECT IN UNDERCARRIAGE OF A VEHICLE

CROSS-REFERENCE TO RELATED APPLICATIONS

This application claims priority to PCT application no. PCT/IN2016/050178 filed on Jun. 9, 2016, the complete disclosure of which, in its entirely, is herein incorporated by reference.

BACKGROUND

Technical Field

The embodiments herein generally relate to vehicle scanning system, and, more particularly, to a system and method for detecting a dissimilar object in an undercarriage of a vehicle based on 3-dimensional image data of the undercarriage of the vehicle.

Description of the Related Art

In the current context, security threats to people and buildings abound. Vehicles can be used potentially to transport explosives by attaching the explosive to an undercarriage/underbody of the vehicle. The vehicle underbody inspection or under vehicle inspection are performed by different means with varying levels of efficiency using mirrors, systems which record and play-back the video from multiple CCTV video cameras, and systems that (a) captures the complete underside view in a multiple images by means of one or multiple line-scan, and/or area scan cameras, and (b) combines the multiple images captured by the camera in an intelligent fashion to form composite image(s). Some of the composite image based systems automatically compare the image obtained for a particular vehicle with a reference image of the same type of the vehicle, and check for differences using image processing algorithms.

PCT publication WO2007032025 discloses a method and a system for network based automatic inspection of vehicles which detects the location and time instants of the vehicle at predefined points. Images of the vehicle are captured and a composite image is formed automatically adjusting the intensity and contrast for improving the visual clarity of the processed image. These images are processed to detect model of the vehicle, and compared with pre-captured images stored in the database to identify differences.

U.S. Patent publication numbered 20080239079 provides an entry control device which recognizes a vehicle by its undercarriage image. The system compares a new vehicle undercarriage image with those stored in a reference database to facilitate the automatic search of a vehicle's undercarriage. The system further compares the new undercarriage image to the same or similar undercarriage image previously entered in the reference database, highlighting any anomalies.

The European patent application number 1482329 discloses a system for detecting hidden objects under a vehicle. The system includes (a) a camera for taking an image of the undercarriage of the vehicle, (b) a memory for storing a reference image, and (c) a processor which compares the image to the reference image and outputting an alert when there are significant differences between the image and reference image.

One main aspect of all the existing digital or automated systems for underside inspection is capturing the two-dimensional images/data, including in some cases images from multiple views, for display or processing. However, the multiple images/views are two dimensional data which are being processed. Inspection using the same is inefficient, because these systems do not compute the 3D profiles of the vehicle to find the dissimilar object undercarriage of the vehicle with more accuracy.

PCT publication no. WO2014005804 discloses a method for testing a vehicle underbody of a motor vehicle. The method involves steps of: (a) acquiring images of the vehicle underbody, (b) generating a three-dimensional depth image with the aid of the acquired images, and (c) testing the vehicle underbody generated three-dimensional depth image.

In another existing system, SAFER (Security Automation and Future Electromotive Robotics) was proposed by the Imaging, Robotics, and Intelligent Systems (IRIS) Laboratory at The University of Tennessee (UT). In this system, 3D scans are collected under the vehicle carriages. The scans require appropriate segmentation and representation algorithms to facilitate the vehicle inspection process.

The U.S. Pat. No. 8,150,105 discloses generation of a three-dimensional profile of an object, such as a vehicle, using image data corresponding to the object. The 3D profile can be captured using different acquisition means, including laser scanner, laser triangulation as the object passes an inspection location. The three-dimensional profile can be analyzed to identify any anomalies that are associated with the object.

Even though these systems are capturing the images and 3D profiles of the vehicle underside by various means and arrangements for inspection purposes, they do not disclose a method of: (a) comparing the vehicle with the standard vehicle model to detect the dissimilar objects under the vehicle, and (b) finding the dissimilar objects from the 3D profiles when the vehicle is passed at different speeds.

Inspection of the vehicle profiles other than the underside of the vehicle such as top or sides of the vehicle are necessary for other applications (i.e. analyzing the vehicle, cross checking the vehicle) apart from the security. For example, damage inspection for insurance purposes, theft assessment, etc. are some applications where inspection of the vehicle overhead and sides are carried out.

Accordingly, there remains a need for a system and method to detect a dissimilar object in underside of a vehicle in efficient way.

SUMMARY

In view of a foregoing, an embodiment herein provides an under vehicle scanning system that detects a dissimilar object in a vehicle. The under vehicle scanning system includes (a) a scanner and acquisition module that is configured to capture one or more three dimensional (3D) images of an undercarriage of the vehicle at multiple instants when the vehicle crosses a structural unit with a slit, (b) an analysis and processing module that is configured to process the one or more 3D images to obtain one or more 3D profiles of the undercarriage of the vehicle, and (c) a display module that highlights the dissimilar object when the dissimilar object is detected in the undercarriage of the vehicle. The analysis and processing module further configured to: (a) normalize variations in orientation of the one or more 3D profiles of the vehicle's undercarriage, (b) generate a 3D signature of the vehicle based on the one or more normalized 3D profiles of the vehicle's undercarriage, (c) identify a model of the vehicle based on the 3D signature of the vehicle, and (d) compare the one or more 3D profiles of the undercarriage of the vehicle with a standard profile of the undercarriage of a same model vehicle using the 3D signature to detect the dissimilar object.

In one embodiment, the scanner and acquisition module includes an image capturing unit that is installed at a depth below a ground surface level to cover the entire width of the vehicle.

In another embodiment, the image capturing unit includes a three dimensional depth sensor to capture the one or more three dimensional (3D) images of the undercarriage of the vehicle.

In yet another embodiment, the display module provides an interactive visualization of the one or more 3D profiles of the vehicle, alongside with the standard profile of the vehicle, by zooming in to an area of interest in the one or more 3D profiles of the vehicle.

In yet another embodiment, when a specific region on the one or more 3D profiles of the undercarriage of the vehicle is selected, the display module provides a zoom option to enable a relative mode visualization to analyze the specific region on the one or more 3D profiles of the vehicle's undercarriage.

In one aspect, a system for scanning an underside of a vehicle to detect a dissimilar object is provided. The system includes (a) a scanner and acquisition module that is configured to capture one or more three dimensional (3D) images of an undercarriage of the vehicle at multiple instants when the vehicle crosses a structural unit with a slit, (b) an analysis and processing module that is configured to process the one or more 3D images to obtain one or more 3D profiles of the undercarriage of the vehicle, and (c) a display module that highlights the dissimilar object when the dissimilar object is detected in the undercarriage of the vehicle. The analysis and processing module further configured to: (a) normalize variations in orientation of the one or more 3D profiles of the vehicle's undercarriage, (b) generate a 3D signature of the vehicle based on the one or more normalized 3D profiles of the vehicle's undercarriage, (c) identify a model of the vehicle based on the 3D signature of the vehicle, and (d) compare the one or more 3D profiles of the vehicle with a standard profile of the undercarriage of a same model vehicle using the 3D signature to detect the dissimilar object. The display module provides an interactive visualization of the one or more 3D profiles of the vehicle, alongside with the standard profile of the vehicle, by zooming in to an area of interest in the one or more 3D profiles of the vehicle. When a specific region on the one or more 3D profiles of the undercarriage of the vehicle is selected, the display module provides a zoom option to enable a relative mode visualization to analyze the specific region on the one or more 3D profiles of the vehicle's undercarriage.

In one embodiment, the interactive visualization of the one or more 3D profiles of the vehicle is computed based on depth histogram.

In another aspect, a method of detecting a dissimilar object in a vehicle using a three dimensional (3D) under vehicle scanning system is provided. The method includes following steps of: (a) capturing one or more 3D images of an undercarriage of the vehicle when the vehicle crosses a structural unit with a slit of the 3D under vehicle scanning system, (b) processing the one or more 3D images to obtain one or more 3D profiles of the undercarriage of the vehicle, (c) normalizing variations in orientation of the one or more 3D profiles of the vehicle's undercarriage, (d) generating a 3D signature of the vehicle based on the one or more normalized 3D profiles of the vehicle's undercarriage, (e) identifying a model of the vehicle based on the 3D signature of the vehicle, (f) comparing the one or more 3D profiles of the vehicle with a standard profile of the undercarriage of a same model vehicle using the 3D signature to detect a dissimilar object, (g) providing an interactive visualization of the one or more 3D profiles of the vehicle, alongside with the standard profile of the vehicle, and (h) highlighting the dissimilar object when the dissimilar object is detected in the undercarriage of the vehicle.

In one embodiment, generating the 3D signature includes the following steps of: (a) initializing a point set for a line of the one or more 3D profiles with a first point, (b) comparing depth of each point along the line with depths of a previous point and a next point to add a current point at a change or discontinuity in the monotonic nature of the depth of the 3D profile line of the vehicle, (c) continuing the step (b), till an end of the line is reached, and add a last point, (d) calculating a value of z (i.e. depth details of the vehicle) for each of the interceding points, based on the line between the first point and the next point for each consecutive pair of points, (e) subtracting the calculated value of z from an actual value of z in the 3D profile line to obtain a difference value, and (f) adding difference value to curvature for generating the 3D signature of the vehicle.

In another embodiment, the steps (a) to (f) are performed for each of the lines of the one or more 3D profiles for generating the 3D signature of the vehicle.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Various embodiments of the methods and systems disclosed herein provide a under vehicle scanning system that includes a scanner and acquisition unit (SAU) and an analysis and processing unit (APU). The SAU includes an image capturing unit (i.e. a three dimensional depth sensor) that captures three dimensional images of the undercarriage of the vehicle when the vehicle crosses the under vehicle scanning system. The APU processes and analyzes the three dimensional images/profiles of the vehicle's undercarriage to detect a dissimilar object in the undercarriage of the vehicle. Referring now to the drawings, and more particularly to FIGS. 1 through 7, where similar reference characters denote corresponding features consistently throughout the figures, there are shown preferred embodiments.

Figure 1:
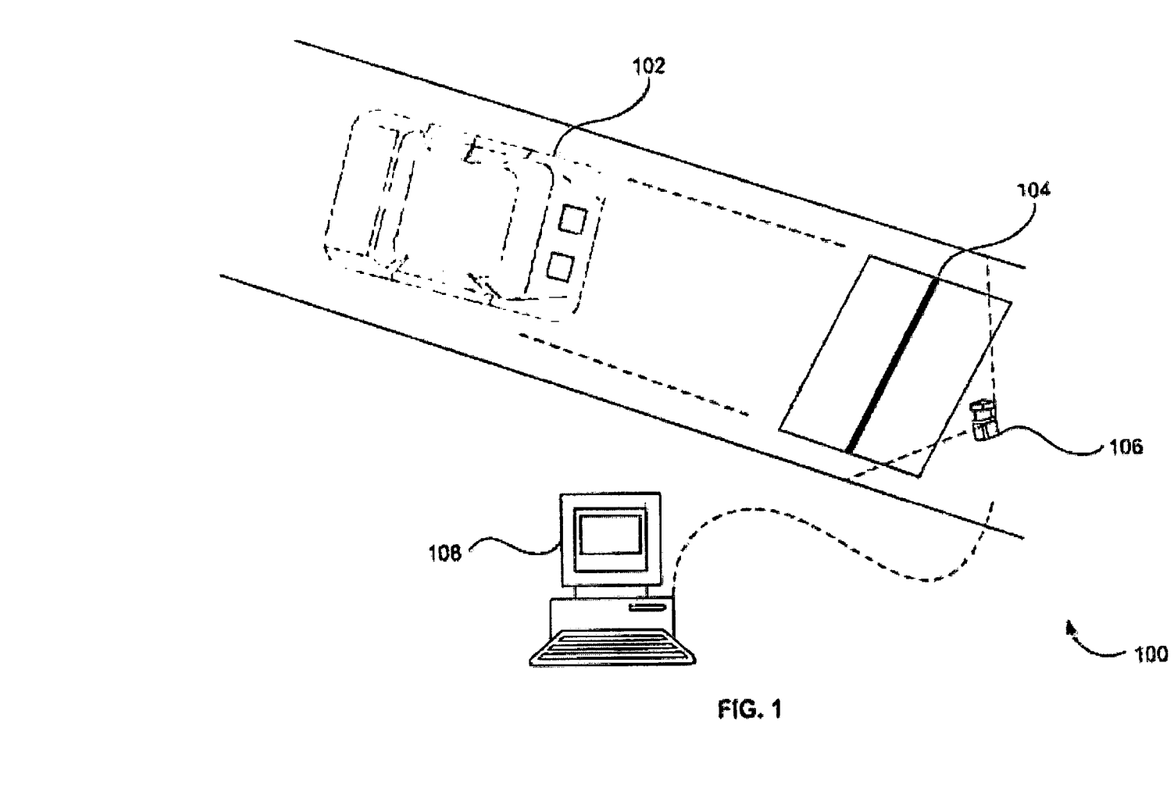
FIG. 1 illustrates a system view of an under vehicle scanning system that detects a dissimilar object in undercarriage of a vehicle using a three dimensional (3D) profile of the vehicle according to an embodiment herein.

FIG. 1 illustrates a system view of an under vehicle scanning system 100 that detects a dissimilar object in an undercarriage of a vehicle 102 using a three dimensional (3D) profile of the vehicle according to an embodiment herein. The under vehicle scanning system 100 includes a structural unit with a slit 104, an image capturing unit 106 (e.g. a three dimensional depth sensor), and an analysis and processing unit 108 (APU). The image capturing unit 106 may be included in a scanner and acquisition unit (SAU). The image capturing unit 106 captures three dimensional images/profiles of the undercarriage of the vehicle 102 when the vehicle 102 crosses the structural unit with the slit 104. The structural unit with the slit 104 may be placed on a top plate assembly of the under vehicle scanning system 100. In another embodiment, the image capturing unit 106 is installed at least one of (a) top side, (b) front side, (c) back side, (d) left side, (e) right side, and (f) bottom side of the vehicle 102 to capture three dimensional profiles of the corresponding vehicle portion, when the vehicle crosses the image capturing unit 106. The image capturing unit 106 may be a three dimensional (3D) depth sensor. The 3D depth sensor may be a Laser scanning sensor, a Triangulation based sensor, a Time-of-Flight camera, a Stereo 3D camera, a Structured Lighting based sensors, or any other form of sensor capable of providing a 3D depth profile of a viewing area. In one embodiment, the image capturing unit 106 is covered with a waterproof casing. In another embodiment, the image capturing unit 106 is communicatively connected to the analysis and processing unit 108. The APU 108 includes a receiver to receive the three dimensional images/profiles from the image capturing unit 106. In one embodiment, the image capturing unit 106 captures two dimensional images/profiles and displays the two dimensional images/profiles to improve visualization. In another embodiment, the image capturing unit 106 captures three dimensional images/profiles of all sides of the vehicle 102 when the vehicle 102 crosses the structural unit with the slit 104.

The APU 108 generates a 3D signature of the vehicle 102 based on the three dimensional images/profiles of the undercarriage of the vehicle 102. The APU 108 process and analyzes the 3D signature of the vehicle 102 to detect a dissimilar object in the undercarriage of the vehicle 102.

Figure 2:
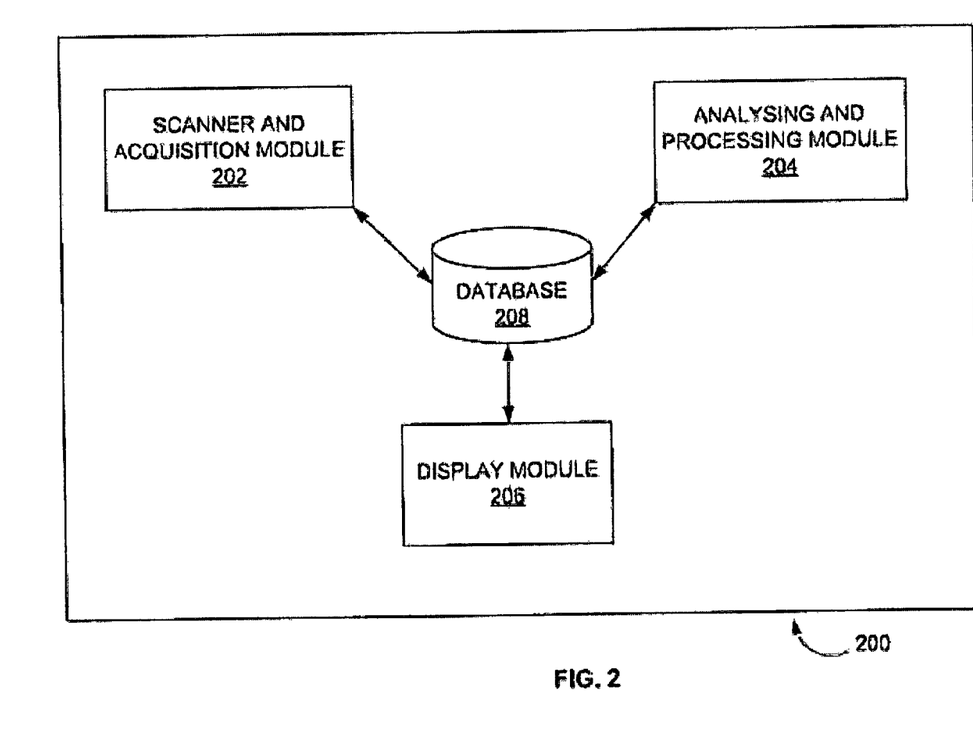
FIG. 2 illustrates an exploded view of the under vehicle scanning system of FIG. 1 according to an embodiment herein.

FIG. 2 illustrates an exploded view 200 of the under vehicle scanning system 100 of FIG. 1 according to an embodiment herein. The exploded view 200 includes a scanner and acquisition module 202, an analysis and processing module 204, a display module 206 and a database 208. The scanner and acquisition module 202 captures depth details (i.e. 3D images/profiles) of the undercarriage of the vehicle 102 using the image capturing unit 106 (e.g., a three dimensional (3D) depth sensor) when the vehicle 102 crosses the structural unit with the slit 104. In one embodiment, the scanner and acquisition module 202 captures depth details of the undercarriage of the vehicle 102 irrespective of a way (i.e. speed patterns of the vehicle 102, and lateral shifts and orientation of the vehicle 102) in which the vehicle 102 driven over the image capturing unit 106. The scanner and acquisition module 202 is installed at a suitable depth below a ground surface level, such that the angle of view of the scanner and acquisition module 202 covers the entire width of the vehicle 102. In one embodiment, the scanner and acquisition module 202 captures 3D images along the length of the vehicle 102 at multiple instants. In yet another embodiment, the scanner and acquisition module 202 includes sensors (e.g., an inductive loop, a piezo sensor, a magnetic sensors, or an ultrasound sensor) to detect an entry and exit of the vehicle 102 from the scanning area.

The analysis and processing module 204 combines the 3D images captured by the image capturing unit 106 across the passage of the entire vehicle 102 to produce a 3D profile of the vehicle undercarriage. In one embodiment, the 3D profile is represented as 3D point cloud data. The analysis and processing module 204 process the 3D profile (i.e. three dimensional point cloud representation) of the vehicle undercarriage, and generates a 3D signature of the vehicle 102. In one embodiment, the 3D signature includes depth variations of the 3D profile of the vehicle 102 that helps comparison of the 3D profile of the undercarriage of the vehicle 102 with a standard profile of the undercarriage of the vehicle 102.

The analysis and processing module 204 identifies a model of the vehicle 102 based on the 3D signature of the vehicle 102. The analysis and processing module 204 compares the 3D profiles of the vehicle 102 with the standard profile stored in the reference database to detect the dissimilar object. In one embodiment, when the dissimilar object is detected, the dissimilar object may be highlighted in the display module 206, or an alarm may be generated to alert the security personal. The display module 206 further provides a dynamic and an interactive visualization of the 3D profile of the vehicle 102, alongside with a standard profile of the vehicle 102. The analysis and processing module 204 may be connected to the scanner and acquisition sensor 202 module by a wired connection, or a wireless connection.

The display module 206 provides an option to visualize the 3D profile of the undercarriage of the vehicle 102. In one embodiment, the 3D profile of the undercarriage of the vehicle 102 is visualized in following modes: (a) an absolute mode, and (b) a relative mode. The visualization of the 3D profile of the undercarriage of the vehicle 102 is computed based on a depth histogram based technique. Initially, a depth histogram of entire range of the depths of the 3D profile of the undercarriage of the vehicle 102 is computed. A cumulative depth histogram of the 3D profile of the undercarriage of the vehicle 102 is then computed, and the depths are remapped in a linear scale based on frequency of points at each of different depth levels of the cumulative depth histogram. During visualization, the remapped 3D profile of the vehicle 102 is displayed in the display module 206.

The display module 206 provides interactive visualization by zooming into an area of interest in the 3D profile of the vehicle 102. When a user selects a specific region on the 3D profile of the undercarriage of the vehicle 102, the display module 206 provides a zoom button, a relative mode visualization to the user to analyze the specific region on the 3D profile of the undercarriage of the vehicle 102. When a specific region on the 3D profile of the undercarriage of the vehicle 102 is selected by the user, the depth histogram is recomputed for the selected region, and the remapped 3D profile is generated, and displayed in the display unit. Since, the selected region is smaller than the entire vehicle 102, the relative mode enhances the depth differences of the objects, and enables efficient visualization.

In one embodiment, the database 208 includes the following information for each model of the vehicle 102: (a) a name of the vehicle model, (b) a model ID (i.e. a system unique id used for indexing), (c) a 3D profile acquired for the vehicle, and (d) a 3D signature computed from the 3D profile of the vehicle.

In one embodiment, the under vehicle scanning system 100 includes camera modules to (a) capture a front/rear part of the vehicle 102, and (b) automatically recognize a number plate using OCR technology. The camera modules may capture photographs/images of a driver, and other occupants. In another embodiment, the under vehicle scanning system 100 may include more inspection consoles, either locally or on the network for remote monitoring/controlling.

In one embodiment, the 3D signature includes information only about the points in the 3D profile of the undercarriage of the vehicle 102 which are different from other points in the 3D profiles of the vehicle 102, thereby reduces memory and improves the computation process.

In yet another embodiment, the 3D signature of the undercarriage of the vehicle 102 is computed using a point cloud profile representation (i.e. a set of points in the X, Y, and Z geometric coordinate space). The 3D signature is a set of multi-dimensional data point representation of the depth variations of the 3D profile of the vehicle 102 across each row, and column. The computation process of 3D signature includes two steps. The first step is to normalize the point cloud for variations in orientation and lateral shifts of the 3D profile of the undercarriage of the vehicle 102. The objective of the first step is to orient the axes of the 3D profile of the undercarriage of the vehicle 102 based on a pre-defined standard, like x-axis along the width of the vehicle 102, y-axis along the length of the vehicle 102, and z-axis along the depth of the 3D profile of the vehicle 102. As per the configuration of the scanner and acquisition module 202, the z-axis of the point cloud or 3D profile of the undercarriage of the vehicle 102 represents the depth which is retained unchanged. But, the x-axis and the y-axis are affected by speed, rotation and the lateral shifts of the vehicle 102. Principal Component Analysis (PCA) is used to find the orientation of the vehicle 102, and is applied only in the x and y dimensions of the 3D point cloud. The origin of the 3D profile of the vehicle 102 is shifted to the centroid of the points, and the point cloud rotated to align the first principal component with the y-axis. The x-axis is taken perpendicular to the y-axis after realignment.

Figure 3A:
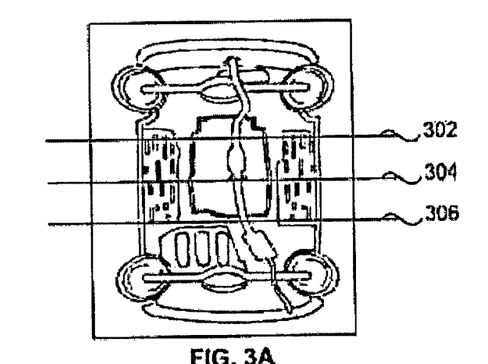
FIGS. 3A-3C illustrate one or more 3D profile variations of the vehicle according to an embodiment herein.
Figure 3B:
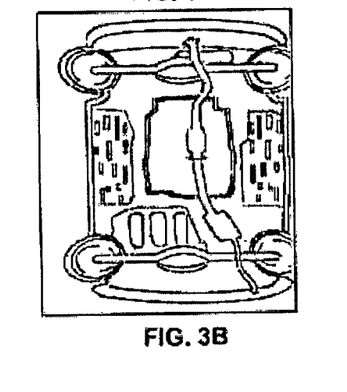
Figure 3C:
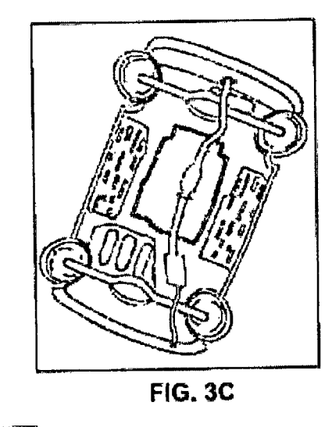

With reference to the FIG. 1 and FIG. 2, FIGS. 3A-3C illustrate one or more 3D profile variations of the vehicle 102 according to an embodiment herein. The FIGS. 3A-3C show one or more 3D profiles variations of the vehicle 102 due to the driving pattern when the vehicle 102 passes the structural unit with the slit 104. Some of the drive patterns may be (i) the vehicle 102 is driven at low speed, (ii) the vehicle 102 is driven at high speed, (iii) the vehicle 102 is driven at varying speeds, (iv) the vehicle 102 is stopped for a short while over the structural unit with the slit 104, (v) the vehicle 102 is driven laterally off-centre, and (vi) the vehicle 102 is driven at an angle over the scanner and acquisition module 202. The 3D profile of the vehicle 102 that is illustrated in FIG. 3A includes one or more lines (i.e. 302, 304, 306, etc.), which represent cross sections at one or more points/regions of the vehicle 102.

Figure 4A:
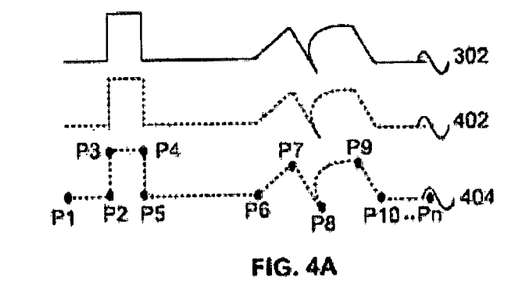
FIG. 4A illustrates steps performed on any one of the lines of the 3D profiles/three dimensional (3D) point cloud representation of the vehicle in the process of generating the 3D signature according to an embodiment herein.

With reference to FIG. 3A, FIG. 4 illustrates steps performed on any one of the lines (i.e. 302, 304, 306, etc.) of the 3D profiles/three dimensional (3D) point cloud representation of the vehicle 102 in the process of generating the 3D signature according to an embodiment herein. In the 3D point cloud, a line 302 is a cross section at one point of the vehicle 102 including all points with same value of "y" (i.e. considered as "Y" (along the vehicle 102 length) in the steps below). A line 402 illustrates a sampling resolution of the three dimensional depth sensor, resulting in multiple points along the line 302. For generating the 3D signature of the undercarriage of the vehicle 102, the points marked out in line 404 of the 3D profile of the vehicle 102 is retained for the line 402, when the current direction or a shape of the point cloud changes when moving along the point cloud line in the x direction.

A method of calculating the points where the point cloud changes includes the following steps: (a) initialize a point set for the line 402 with the first point P1 (as shown in line 404), (b) for each point along the line 402 compares the depth of the current point with the depths of the previous point and the next point, and add the current point, if any change or discontinuity in the monotonic nature of the depth of the points along the line 402 (i.e. direction of increase, decrease or constancy of the depth values), and (c) continue the step (b), till the end of the line 402 is reached, and add the last point Pn.

The point set for the line 402 includes the key points P1, P2, P3 Pn along the line 404, represented as (x1, Y, z1), (x2, Y, z2), (x3, Y, z3) . . . (xm, Y, zm), (xn, Y, zn). The key points are added with curvature related information to capture all information on the line 402. The 3D signature includes multi-dimensional point set with values derived from P1, P2 Pn for each line (i.e. 402), and initialized to (x1, Y, z1, 0, 0), (x2, Y, z2, 0, 0) . . . (xn, Y, zn, 0, 0). The last two dimensions (0s) include information related to curvature before and after the point respectively.

The method further includes the step of: (d) traverse the point set from P1 to Pn for each consecutive pair of points (i.e. P1:P2, P2:P3, . . . Pm:Pn), (e) form the following equation of the line between the P1 (x1, Y, z1) and the P2 (x2, Y, z2), for any given x (along the vehicle 102 width) between x1 and x2, z (depth component/depth details of the vehicle 102) can be calculated as, $z=z1+((z2-z1)/(x2-x1))*(x-x1)$, (e) using the above equation, the information about curved regions is represented by curvature which is initialized to 0, (f) for all points between x1 and x2, calculate z from the equation, and subtract the calculated value of z from the actual value of z of the point (x, Y, z) in the point cloud, and add the difference to the curvature, (g) the curvature is zero if the points are strictly linear or flat, but the curvature is a positive value, if the curve is upward above the straight line between P1 and P2 or negative if the curve is below the line between P1 and P2 and finally update the 3D signature by distributing half of the curvature to the 5th component for P1 and 4th component for P2 to represent the curved region between P1 and P2, and (h) repeat steps (for example, for all points on the line).

The final result of the step is a point-set for each line that is reduced down from multiple hundreds or thousands points in the 3D profile. Each point is a multi-dimensional tuple of the form (i.e. X, $Y_{eff}$, Z, LC, RC), where LC (left-curvature) and RC (right-curvature) represents the non-linearity between the current point to the previous and next points respectively, X and Z are the x and z values directly from the 3D profile. The $Y_{eff}$ for the first line is 1.

The point sets for each line (i.e. 302, 304, 306, etc.) of the 3D profile are computed, starting from the top. The computed point sets of the 3D profile of the vehicle 102 is compared line by line, each point at a time: $P1_{line1}$ of the first point set is compared with $P1_{line2}$ of the second point set, $P2_{line1}$ of the first point set is compared with $P2_{line2}$ of the second point set, and so on, where $P1_{line1}$ is ($x1_{line1}$, $y1_{line1}$, $z1_{line1}$, $LC1_{line1}$, $RC1_{line1}$), and $P1_{line2}$ ($x1_{line2}$, $y1_{line2}$, $z1_{line2}$, $LC1_{line2}$, $RC1_{line2}$) and so forth. If the current point set is different (i.e. except for the Y component) from the previous point set, increment $Y_{eff}$ by 1, update the current point set with the new $Y_{eff}$ and add the point set from the current line to the 3D signature set. This step above ensures that any linear/non-linear expansion in the length (along Y direction) of the 3D profile caused by varying speed patterns does not impact the 3D signature. The final 3D signature which includes the various point sets of the unique lines is a minimal representation of the unique features of the 3D profile of the vehicle 102.

Figure 4B:
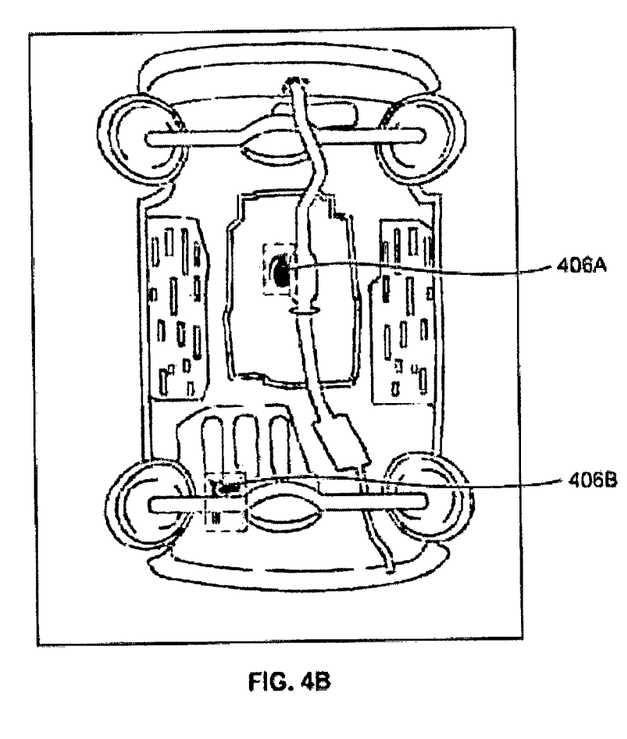
FIG. 4B illustrates a 3D profile of the vehicle with dissimilar objects according to an embodiment herein.

FIG. 4B illustrates a 3D profile of the vehicle 102 with dissimilar objects 406A-B according to an embodiment herein. The APU 108 processes the 3D profile of the vehicle 102 to identify the dissimilar objects 406A-B using the 3D signature. When the 3D profiles are compared, the dissimilar objects 406A-B or an area encompassing the dissimilar objects 406A-B causes the 3D signature to be different from the reference 3D signature stored in the database 208 whereas the 3D signature of other areas would be similar to the corresponding parts of the reference 3D signature. In an embodiment, the identified dissimilar areas are marked out for visualization in the display unit.

Figure 5A:
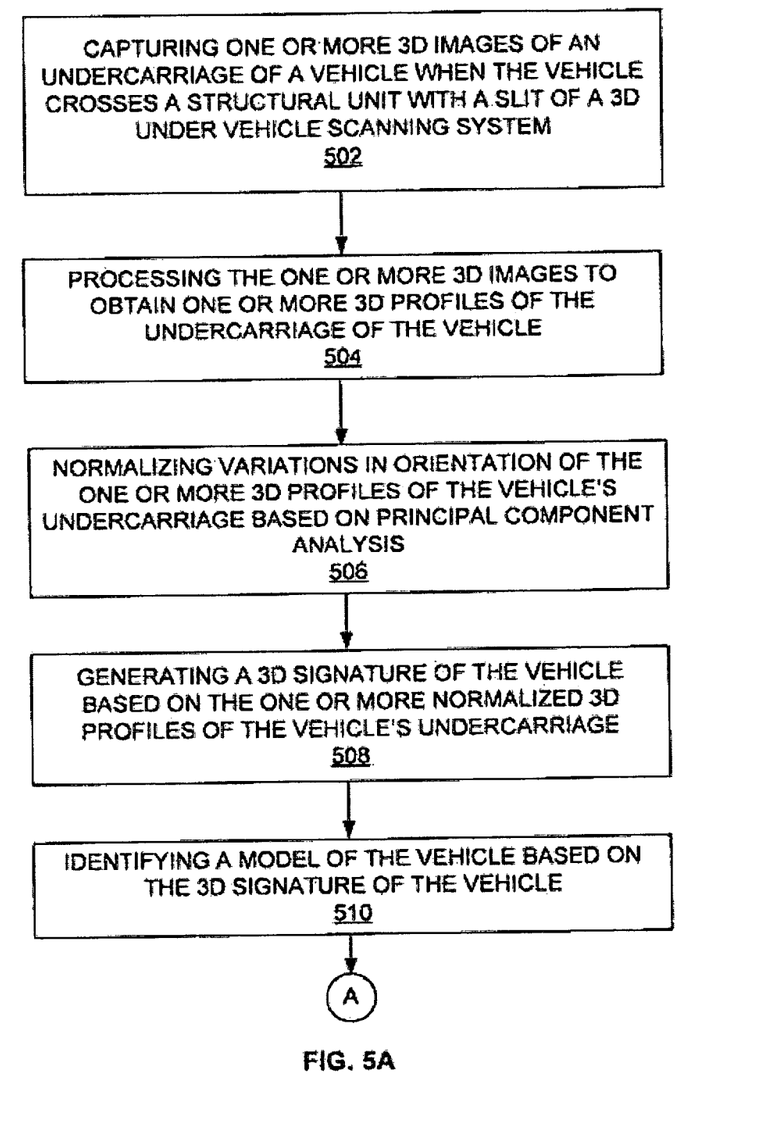
FIGS. 5A and 5B are flow diagrams illustrating a method of detecting a dissimilar object in an undercarriage of a vehicle using a under vehicle scanning system of FIG. 1 according to an embodiment herein.
Figure 5B:
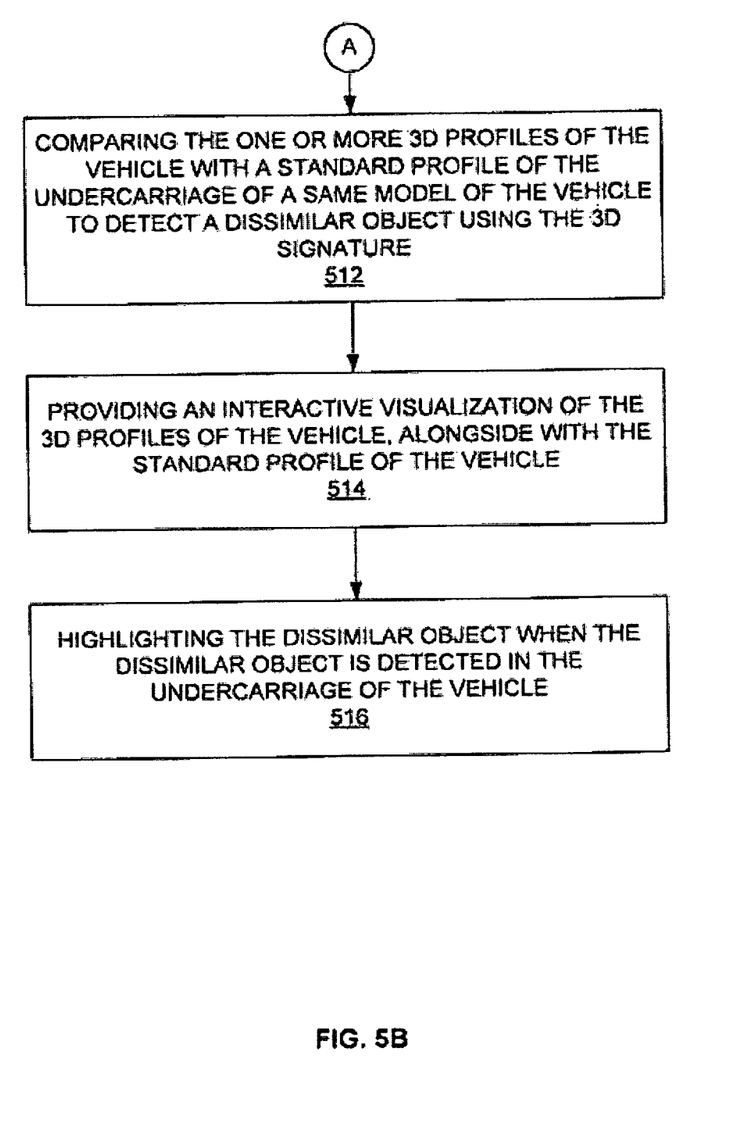

FIGS. 5A and 5B are flow diagrams illustrating a method of detecting a dissimilar object in an undercarriage of a vehicle using the under vehicle scanning system 100 of FIG. 1 according to an embodiment herein. At step 502, one or more 3D images of an undercarriage of the vehicle 102 is captured using the image capturing unit 106 when the vehicle 102 crosses the structural unit with a slit 104 on the top plate assembly of the 3D under vehicle scanning system 100. At step 504, the one or more 3D images are processed to obtain one or more 3D profiles of the undercarriage of the vehicle 102. At step 506, the variations in orientation of the one or more 3D profiles, or the three dimension point cloud of the vehicle's undercarriage are normalized based on principal component analysis (PCA). At step 508, a 3D signature of the undercarriage of the vehicle 102 is generated based on the one or more normalized 3D profiles of the vehicle's undercarriage. At step 510, a model of the vehicle is identified by comparing the 3D signature of vehicle 102 with the at least some of the 3D signatures stored in the reference database. At step 512, the one or more 3D profiles of the vehicle 102 are compared with a standard profile of the undercarriage of a same model vehicle using the 3D signature to detect a dissimilar object. At step 514, an interactive visualization of the 3D profiles of the vehicle 102, alongside with the standard profile of the vehicle is provided. At step 516, the dissimilar object is highlighted in the display module 206 when the dissimilar object is detected in the undercarriage of the vehicle 102. In one embodiment, the method of generating the 3D signature of vehicle 102 includes the following steps of: (a) initializing a point set for each line (i.e. 302, 304, 306, etc.) of the one or more 3D profiles with a first point, (b) comparing a depth of each point along the line with depths of a previous point and a next point to add a current point at a change or discontinuity in the monotonic nature of the depth of the vehicle 102 occurs, (c) continuing the step (b), till an end of the line is reached, and add a last point, (d) calculating a value of z (i.e. depth details of the vehicle) based on the line between the first point and the next point for each consecutive pair of points, (e) subtracting the calculated value of z from an actual value of z of the first point in the point cloud to obtain an difference value, and (f) adding difference value to curvature for updating the 3D signature of the vehicle 102.

Figure 6:
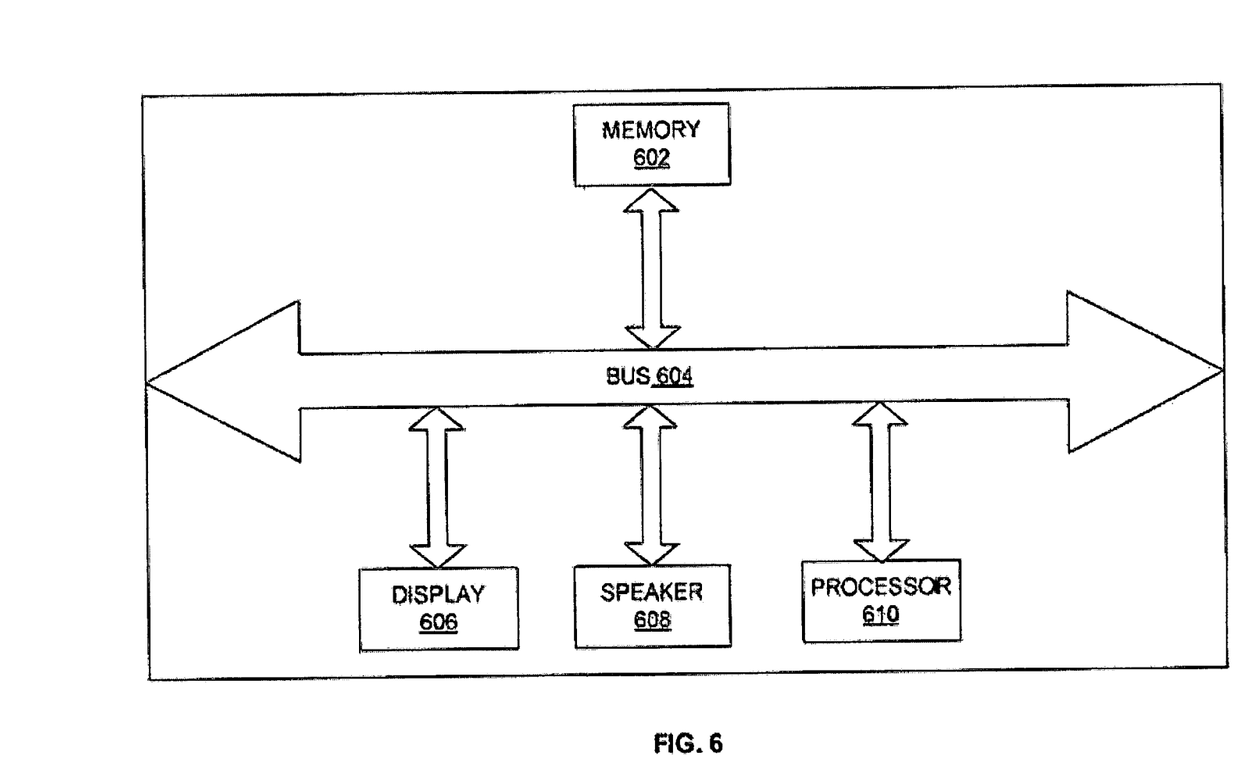
FIG. 6 illustrates an exploded view of a receiver used in accordance with the embodiments herein.

FIG. 6 illustrates exploded view of a receiver having a memory 602 having a computer set of instructions, a bus 604, a display 606, a speaker 608, and a processor 610 capable of processing a set of instructions to perform any one or more of the methodologies herein, according to an embodiment herein. The processor 610 may also enable digital content to be consumed in the form of video for output via one or more displays 606 or audio for output via speaker and/or earphones 608. The processor 610 may also carry out the methods described herein and in accordance with the embodiments herein. Digital content may also be stored in the memory 602 for future processing or consumption. The memory 602 may also store program specific information and/or service information (PSI/SI), including information about digital content (e.g., the detected information bits) available in the future or stored from the past. A user of the receiver may view this stored information on display 606 and select an item of for viewing, listening, or other uses via input, which may take the form of keypad, scroll, or other input device(s) or combinations thereof. When digital content is selected, the processor 610 may pass information. The content and PSI/SI may be passed among functions within the receiver using bus 604.

The embodiments herein can take the form of an entirely hardware embodiment, an entirely software embodiment or an embodiment including both hardware and software elements. The embodiments that are implemented in software include but are not limited to, firmware, resident software, microcode, etc.

Figure 7:
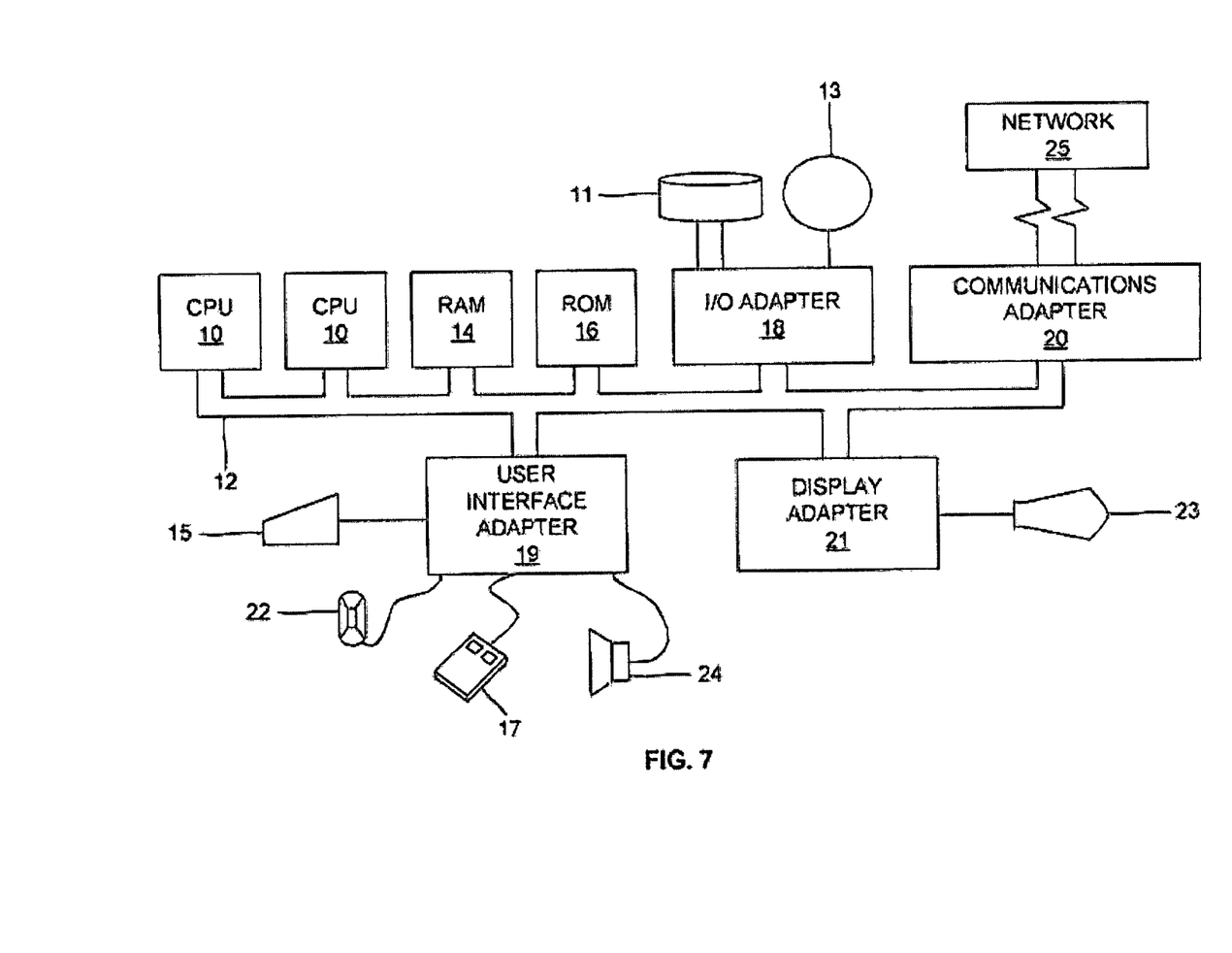
FIG. 7 illustrates a schematic diagram of a computer architecture used in accordance with the embodiments herein.

A representative hardware environment for practicing the embodiments herein is depicted in FIG. 7. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The under vehicle scanning system 100 maintains the 3D signature database of all the standard models of vehicles for model identification and object/difference detection purposes. The under vehicle scanning system 100 may identify a vehicle by a license plate number, or Radio Frequency Identification (RFID). In such case, the current 3D profile is compared against a reference 3D profile of the same vehicle obtained from a database of 3D profiles identified by the license plate number or RFID information.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

We claim:

1. An under vehicle scanning system that detects a dissimilar object in a vehicle, comprising:
   a scanner and acquisition module configured to capture a plurality of three dimensional (3D) images of an undercarriage of the vehicle at multiple instants when the vehicle crosses a structural unit with a slit;
   an analysis and processing module configured to process the plurality of 3D images to obtain a plurality of 3D profiles of the undercarriage of the vehicle, wherein the analysis and processing module further configured to:
   normalize variations in orientation of the plurality of 3D profiles of the vehicle's undercarriage;
   generate a 3D signature of the vehicle based on the plurality of normalized 3D profiles of the vehicle's undercarriage;
   identify a model of the vehicle based on the 3D signature of the vehicle; and
   compare the plurality of 3D profiles of the undercarriage of the vehicle with a standard profile of the undercarriage of a same model vehicle using the 3D signature to detect the dissimilar object; and
   a display module that highlights the dissimilar object when the dissimilar object is detected in the undercarriage of the vehicle;
   wherein the analysis and processing module is configured to generate the 3D signature of the vehicle by:
   (a) initializing a point set for a line of the plurality of 3D profiles with a first point;
   (b) comparing a depth of each point along the line with a depth of a previous point a depth of a next point to add a current point at a change or discontinuity in the monotonic nature of the depth of the vehicle;
   (c) continuing the step (b), till and end of the line is reached, and adding a last point;
   (d) calculating a value of z based on the line between the first point and the next point for each consecutive pair of points;
   (e) subtracting the calculated value of z from an actual value of z for all the points in the 3D profile line to obtain a difference value; and
   (f) adding difference value to curvature for generating the 3D signature of the vehicle.

2. The system as claimed in claim 1, wherein the scanner and acquisition module comprises an image capturing unit that is installed at a depth below a ground surface level to cover the entire width of the vehicle.

3. The system as claimed in claim 2, wherein the image capturing unit comprises a three dimensional depth sensor to capture the plurality of three dimensional (3D) images of the undercarriage of the vehicle.

4. The system as claimed in claim 1, wherein the display module provides an interactive visualization of the plurality of 3D profiles of the vehicle, alongside with the standard profile of the vehicle, by zooming in to an area of interest in the plurality of 3D profiles of the vehicle.

5. The system as claimed in claim 1, wherein when a specific region on the plurality of 3D profiles of the undercarriage of the vehicle is selected, the display module provides a zoom option to enable a relative mode visualization to analyze the specific region on the plurality of 3D profiles of the vehicle's undercarriage.

6. A system for scanning an underside of a vehicle to detect a dissimilar object, comprising:
   a scanner and acquisition module configured to capture a plurality of three dimensional (3D) images of an undercarriage of the vehicle at multiple instants when the vehicle crosses a structural unit with a slit;
   an analysis and processing module configured to process the plurality of 3D images to obtain a plurality of 3D profiles of the undercarriage of the vehicle, wherein the analysis and processing module further configured to:
   normalize variations in orientation of the plurality of 3D profiles of the vehicle's undercarriage;
   generate a 3D signature of the vehicle based on the plurality of normalized 3D profiles of the vehicle's undercarriage;
   identify a model of the vehicle based on the 3D signature of the vehicle; and
   compare the plurality of 3D profiles of the vehicle with a standard profile of the undercarriage of a same model vehicle using the 3D signature to detect the dissimilar object; and
   a display module that highlights the dissimilar object when the dissimilar object is detected in the undercarriage of the vehicle,
   wherein the display module provides an interactive visualization of the plurality of 3D profiles of the vehicle, alongside with the standard profile of the vehicle, by zooming in to an area of interest in the plurality of 3D profiles of the vehicle, and wherein when a specific region on the plurality of 3D profiles of the undercarriage of the vehicle is selected, the display module provides a zoom option to enable a relative mode visualization to analyze the specific region on the plurality of 3D profiles of the vehicle's undercarriages;
   wherein the analysis and processing module is configured to generate the 3D signature of the vehicle by:
   (a) initializing a point set for a line of the plurality of 3D profiles with a first point;

(b) comparing a depth of each point along the line with a depth of a previous point and a depth of a next point to add a current point at a change or discontinuity in the monotonic nature of the depth of the vehicle;

(c) continuing the step (b), till an end of the line is reached, and adding a last point;

(d) calculating a value of z based on the line between the first point and the next point for each consecutive pair of points;

(e) subtracting the calculated value of z from an actual value of z for all the points in the 3D profile line to obtain a difference value; and (f) adding difference value to curvature for generating the 3D signature of the vehicle.

7. The system as claimed in claim 6, wherein the interactive visualization of the plurality of 3D profiles of the vehicle is computed based on depth histogram.

8. A method of detecting a dissimilar object in a vehicle using a three dimensional (3D) under vehicle scanning system, the method comprising:

capturing a plurality of 3D images of an undercarriage of the vehicle when the vehicle crosses a structural unit with a slit of the 3D under vehicle scanning system;

processing the plurality of 3D images to obtain a plurality of 3D profiles of the undercarriage of the vehicle;

normalizing variations in orientation of the plurality of 3D profiles of the vehicle's undercarriage;

generating a 3D signature of the vehicle based on the plurality of normalized 3D profiles of the vehicle's undercarriage;

identifying a model of the vehicle based on the 3D signature of the vehicle;

comparing the plurality of 3D profiles of the vehicle with a standard profile of the undercarriage of a same model vehicle using the 3D signature to detect a dissimilar object;

providing an interactive visualization of the plurality of 3D profiles of the vehicle, alongside with the standard profile of the vehicle; and highlighting the dissimilar object when the dissimilar object is detected in the undercarriage of the vehicle, wherein generating the 3D signature comprising:

(a) initializing a point set for a line of the plurality of 3D profiles with a first point;

(b) comparing a depth of each point along the line with a depth of a previous point and a depth of a next point to add a current point at a change or discontinuity in the monotonic nature of the depth of the vehicle;

(c) continuing the step (b), till an end of the line is reached, and adding a last point;

(d) calculating a value of z based on the line between the first point and the next point for each consecutive pair of points;

(e) subtracting the calculated value of z from an actual value of z for all the points in the 3D profile line to obtain a difference value; and (f) adding difference value to curvature for generating the 3D signature of the vehicle.

9. The method as claimed in claim 8, wherein the steps (a) to (f) are performed for each of the lines of the plurality of 3D profiles for generating the 3D signature of the vehicle.

* * * * *